United States Patent
Dittes et al.

(10) Patent No.: US 6,945,696 B2
(45) Date of Patent: Sep. 20, 2005

(54) HYDRODYNAMIC THRUST BEARING

(75) Inventors: Ralf Dittes, Tuttlingen (DE); Helmut Hueneke, Aldingen (DE); Joerg Hoffman, Mettlach (DE); Jürgen Oelsch, Hohenroth (DE); Thilo Rehm, Villengen-Schwenningen (DE); Mathias Wildpreth, Villingen-Schwenningen (DE); Olaf Winterhalter, Epfendorf (DE)

(73) Assignee: Minebea Co., Ltd., Nagano (JP)

(*) Notice: Subject to any disclaimer, the term of this patent is extended or adjusted under 35 U.S.C. 154(b) by 109 days.

(21) Appl. No.: 10/621,756

(22) Filed: Jul. 17, 2003

(65) Prior Publication Data

US 2004/0081378 A1 Apr. 29, 2004

(30) Foreign Application Priority Data

Jul. 22, 2002 (DE) .......................... 202 11 066

(51) Int. Cl.[7] .............................................. F16C 32/06
(52) U.S. Cl. ........................................ 384/100; 384/107
(58) Field of Search ........................... 384/100, 107–114, 384/120

(56) References Cited

U.S. PATENT DOCUMENTS

| 5,357,163 | A | | 10/1994 | Minakuchi et al. ............ 310/90 |
| 6,357,916 | B2 | * | 3/2002 | Saeki et al. ................ 384/100 |
| 6,361,216 | B1 | * | 3/2002 | Takahashi et al. .......... 384/123 |
| 6,398,413 | B1 | * | 6/2002 | Inoue et al. ................. 384/112 |
| 2004/0114840 | A1 | * | 6/2004 | Gomyo ........................ 384/107 |

FOREIGN PATENT DOCUMENTS

| DE | 196 37 014 | 3/1998 |
| GB | 274954 | 7/1927 |
| JP | 2000310220 | 11/2000 |
| JP | 2000324753 | 11/2000 |

OTHER PUBLICATIONS

Search Report, Germany, Jul. 2, 2003.

* cited by examiner

Primary Examiner—Thomas R. Hannon
(74) Attorney, Agent, or Firm—Joel Lutzker; Anna Vishev; Schulte Roth & Zabel LLP

(57) ABSTRACT

A hydrodynamic thrust bearing, particularly forming a part of a bearing system for a rotary bearing of spindle motors utilized to power hard disk drives. The thrust bearing includes at least one annular thrust plate and a counter bearing corresponding to the thrust plate. The thrust plate is fixedly mounted on a shaft rotatably supported by means of a radial bearing system. The thrust plate is arranged on the shaft which is provided with an axial bore in the area where the thrust plate is to be positioned. A spherical element fixing the thrust plate is pressed into the axial bore. An outer diameter of the fixing element is greater than the inner diameter of the axial bore. This type of press connection between the thrust plate and the shaft allows comparatively thinner thrust plates to be used while the performance of the thrust bearing remains the same or improves.

5 Claims, 1 Drawing Sheet

HYDRODYNAMIC THRUST BEARING

CROSS REFERENCE TO RELATED APPLICATION

This application claims all rights of priority to German Patent Application No. DE 202 11 066.4, filed on Jul. 22, 2002 (pending).

FIELD OF THE INVENTION

The invention relates to a hydrodynamic thrust bearing, particularly forming a part of a hydrodynamic bearing system for a rotary bearing of spindle motors utilized to power hard disk drives.

BACKGROUND OF THE INVENTION

A hydrodynamic bearing system essentially includes a bearing sleeve, a shaft accommodated in an inner cylindrical bore of the bearing sleeve and at least one radial bearing section provided between the bearing sleeve and the shaft with the aid of which the shaft and the bearing sleeve are supported rotatably with respect to each other. A bearing gap is formed between the shaft and the bearing sleeve. The bearing gap is filled with a liquid lubricant, preferably bearing oil.

To take on axial loads, the bearing system is also provided with a hydrodynamic thrust bearing. The hydrodynamic thrust bearing is formed by a thrust plate preferably arranged at one end of the shaft and a corresponding cover plate. The cover plate forms a counter bearing to the thrust plate and seals the entire bearing system from below so that no lubricant can escape from the bearing system.

In many cases, the connection between the thrust plate and the shaft is realized by means of a press connection. With motors and hard disk drives becoming ever smaller in size, the overall length available for the bearing system is also being reduced. One method which attempts to overcome this situation involves reducing the thickness of the thrust plate. To achieve an optimal press connection, the so-called guiding ratio, the quotient of the compression length t and bore diameter d, should be greater than or equal to 1. The thinner the thrust plate, the harder it is to achieve the required perpendicularity and the greater the required excess size of the shaft in relation to the bore in order to achieve the specified press-out force. This increases the risk that on being mounted onto the shaft, the thrust plate adheres to the shaft due to local cold welding resulting in destroying the perpendicularity between the shaft and the thrust plate.

To avoid this problem when using very thin thrust plates, it is known to connect the thrust plate to the shaft by means of welding. This bonding method is disclosed in JP2000-324753. There is, however, the disadvantage and risk that the bearing system could became contaminated through welding residue that could cause damage to the bearing system. Due to the heat released during the welding process, there is an added risk that the thrust plate could be deformed and thus rendered unusable.

Another possibility revealed in U.S. Pat. No. 5,357,163 is to screw the thrust plate to the end face of the shaft. However, on one hand this means that a planar end face has to be provided at a right angle to the shaft end on the other hand this method requires an additional, fault-prone assembly effort.

Another possible solution is to form the thrust plate and the shaft as one piece. Manufacturing such an integral component with the required tolerances, however, involves a very complex and expensive process.

SUMMARY OF THE INVENTION

The object of the invention is thus to provide a hydrodynamic thrust bearing which allows a stable and high-precision press connection with the shaft even when using very thin thrust plates with a low guiding ratio of t/d<1.

The invention is distinguished by the fact that the thrust plate is arranged on the shaft having an axial bore in the area where the thrust plate is to be positioned. An element fixing the thrust plate is inserted into the axial bore, the fixing element having an outer diameter greater than the inner diameter of the bore.

Pressing the fixing element into the axial bore of the shaft, causes the shaft to expand in the area of the thrust plate, thus creating a radial pressure which fixes the thrust plate to the shaft. The press-out force between the shaft and the thrust plate made possible by the invention is at least as great or greater than the press-out force achieved through a conventional press connection.

A significant advantage of the invention compared to the prior art is that even when a very thin thrust plate is used, a high press-out force and adequate perpendicularity of the thrust plate in relation to the shaft can be achieved.

Commensurate with the fit used between the thrust plate and the shaft, no force or very little force is required to mount the thrust plate. This means that in attaching the thrust plate, no distortion is caused to the shaft and the thrust plate does not adhere to the shaft.

There is a further benefit in the fact that when the thrust plate is mounted and fixed onto the shaft in accordance with the invention, there is no risk that the contact surfaces of the bearing system will become contaminated by filings or suchlike.

However, mounting the thrust plate onto the shaft requires the use of a high-precision mounting device which ensures that the thrust plate is mounted at a right angle to the shaft.

The fixing element should preferably take the form of a sphere and is preferably made of steel, ceramic or brass.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figures 1, 1A:
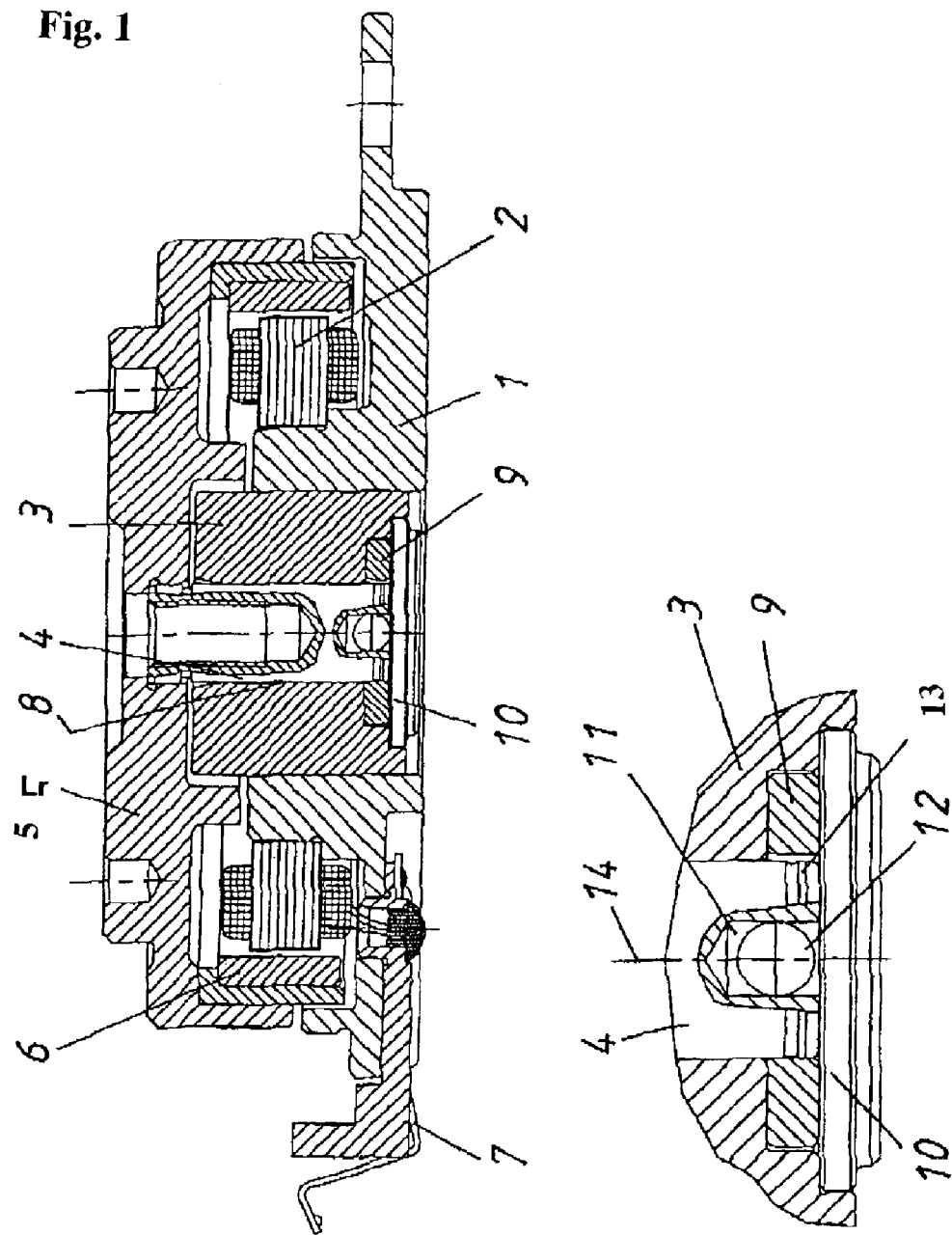
FIG. 1 shows a cross-sectional view of a spindle motor to power a hard disk drive incorporating a first embodiment of the thrust plate according to the invention.
FIG. 1a is an enlarged view of the thrust bearing shown in FIG. 1.

The embodiment described in the specification describes is a spindle motor utilized to power a hard disk drive having a hydrodynamic bearing system constructed in accordance with the invention. In the embodiment illustrated, a shaft carrying a rotor is rotatably supported in a stationary bearing sleeve. As would be understood by a person skilled in the art, the invention also includes designs in which a stationary shaft is enclosed by a rotatable bearing sleeve supporting the rotor.

As shown in FIG. 1, the spindle motor includes stationary baseplate 1 on which stator arrangement 2, consisting of a stator stack and windings, is accommodated. Bearing sleeve 3 is firmly set in a recess of baseplate 1 and features a cylindrical axial bore in which shaft 4 is rotatably accommodated. A free end of shaft 4 supports hub 5 on which one or more storage disks (not illustrated) of the hard disk drive may be arranged and mounted. Located at the inner, lower edge of hub 5 is annular permanent magnet 6 having a plurality of pole pairs which are affected by an alternating electrical field generated by stator arrangement 2 separated from the poles by an air gap so that rotor-hub 5 is set in rotation together with the shaft 4. Power is supplied to the stator windings by using, for example, electric contacts 7.

Bearing gap 8 is formed between an inner diameter of bearing sleeve 3 and the outer diameter of shaft 4. The bearing gap is filled with a lubricant. The hydrodynamic bearing arrangement is formed by two radial bearing sections, not illustrated here in detail, which are marked by a groove pattern which is provided on the surface of shaft 4 and/or on the inner surface of bearing sleeve 3. As soon as rotor-hub 5, and thus shaft 4, is set in rotation, hydrodynamic pressure is built up in the lubricant within bearing gap 8, creating the radial load-bearing capacity of the bearing.

A hydrodynamic thrust bearing is formed at the lower end of shaft 4 by thrust plate 9 connected to shaft 4 and cover plate 10. The hydrodynamic thrust bearing takes on the axial load of the bearing arrangement. Cover plate 10 forms a counter bearing to thrust plate 9 and seals the entire bearing arrangement from below so that no lubricant can escape from bearing gap 8. Both thrust plate 9 and cover plate 10 are accommodated in appropriate recesses in bearing sleeve 3.

The structure of the thrust bearing and particularly the attachment of the thrust plate to the shaft are now explained in more detail with reference to FIG. 1a.

Thrust plate 9 is arranged on the shaft in a sliding fit, a transition fit or by means of a press fit, i.e. the inner diameter of the central bore of thrust plate 9 is slightly larger, the same size or smaller than the outer diameter of the shaft. Shaft 4 is provided with axial bore 11 formed in the area where thrust plate 9 is to be positioned. The diameter of the axial bore preferably equals to at least half the thickness of thrust plate 9. To affix thrust plate 9 to shaft 4, a fixing element 12, in the shape of a sphere, is pressed into axial bore 11 of the shaft. The outer diameter of sphere 12 is preferably greater than the inner diameter of the axial bore. Therefore, when the fixing element is inserted into the bore, the shaft expands in this area and creates radial pressure affixing the thrust plate firmly to the shaft. The larger the axial bore 11 in relation to the diameter of shaft 4 and the greater the excess size of sphere 12 compared to the diameter of the bore, the greater the expansion in shaft 4 caused by the insertion of sphere 12 and the greater the achievable press-out force.

Before sphere 12 is pressed in, thrust plate 9 is set on the shaft at a right angle to rotational axis 14 of shaft 4. A high-precision mounting device may be used for this purpose.

Annular groove 13 can be provided at the outer surface of shaft 4 in the area of thrust plate 9 that ensures more even pressing.

To mount the thrust plate 9 to shaft 4, axial bore 11 is first formed in the shaft in the area where thrust plate 9 is to be positioned. Thrust plate 9 is then slid onto or pressed into shaft 4 and set in the desired position at a precise right angle to rotational axis 14 of shaft 4. Finally, spherical element 12 fixing thrust plate 9 is pressed into axial bore 11 of shaft 4 that causes the diameter of shaft 4 to expand in this area and thus to firmly affix thrust plate 9.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A hydrodynamic bearing system, comprising:
   a shaft having an axial bore formed therein;
   a radial bearing rotatably supporting said shaft;
   at least one annular thrust plate mounted on an outer cylindrical surface of said shaft;
   a fixing element affixing said thrust plate to said shaft, said fixing element being inserted into said axial bore of said shaft; and
   a counter bearing corresponding to said thrust plate,
   wherein said axial bore is formed in an area where said thrust plate is to be positioned, and wherein an outer diameter of said fixing element is greater than an inner diameter of said axial bore.

2. The hydrodynamic bearing system according to claim 1, wherein said fixing element is a sphere.

3. The hydrodynamic bearing system according to claim 1, wherein said shaft further comprises at least one annular groove formed around a circumference of said shaft in said area where said thrust plate is to be positioned.

4. The hydrodynamic bearing system according to claim 1, wherein said thrust plate is arranged in a sliding fit, a transition fit or a press fit on said shaft.

5. The hydrodynamic bearing system according to claim 1, wherein said thrust plate is set at a right angle in relation to said shaft.

* * * * *